US008428348B2

(12) United States Patent
Atallah et al.

(10) Patent No.: US 8,428,348 B2
(45) Date of Patent: Apr. 23, 2013

(54) IMAGE ANALYSIS THROUGH NEURAL NETWORK USING IMAGE AVERAGE COLOR

(75) Inventors: Antoine Atallah, Bellevue, WA (US); Alex Weinstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 12/423,825

(22) Filed: Apr. 15, 2009

(65) Prior Publication Data

US 2010/0266200 A1 Oct. 21, 2010

(51) Int. Cl.
*G06K 9/00* (2006.01)

(52) U.S. Cl.
USPC ............ 382/165; 382/195; 382/224; 382/160

(58) Field of Classification Search .................. 382/157, 382/159, 160, 162, 164, 165, 190, 195, 199, 382/224, 225, 286
See application file for complete search history.

(56) References Cited

U.S. PATENT DOCUMENTS

| | | | |
|---|---|---|---|
| 7,184,080 B2 | 2/2007 | Kehtarnavaz et al. | |
| 7,295,700 B2 | 11/2007 | Schiller et al. | |
| 7,369,699 B1 | 5/2008 | Christie | |
| 2003/0142094 A1* | 7/2003 | Zhang | 345/440 |
| 2005/0004910 A1* | 1/2005 | Trepess | 707/5 |
| 2005/0135667 A1* | 6/2005 | Saarela et al. | 382/141 |
| 2006/0095852 A1* | 5/2006 | Trepess et al. | 715/741 |
| 2008/0131001 A1 | 6/2008 | Hofman et al. | |

OTHER PUBLICATIONS

Laaksonen, et al., "Analyzing Low-Level Visual Features Using Content-Based Image Retrieval", 7th International Conference on Neural Information Processing, retrieved at <<http://www.cis.hut.fi/projects/cbir/papers/iconip2000.pdf>>, Nov. 14-18, 2000.
Xu, et al., "Automatic Color Identification in Printed Fabric Images by a Fuzzy-Neural Network", AATCC Review, retrieved at <<http://www.he.utexas.edu/graphics/5-color-print.pdf>>, vol. 2, No. 9, 2002.
Guthikonda, Shyam K., "Kohonen Self-Organizing Maps", Wittenberg University, retrieved at <<http://www.shy.am/wp-content/uploads/2009/01/kohonen-self-organizing-maps-shyam-guthikonda.pdf>>, Dec. 2005.
Imo, et al., "Interactive Feature Visualization for Image Retrieval", 19th International Conference on Pattern Recognition, retrieved at <<http://figment.cse.usf.edu/~sfefilat/data/papers/TuCT2.4.pdf>>, Dec. 8-11, 2008.
Moreira, et al., "Neural-based color image segmentation and classification using self-organizing maps", In Proceedings of SIBGRAPI '96, retrieved at <<http://mirror.impa.br/sibgrapi96/trabs/pdf/a19.pdf>>, 1996.

* cited by examiner

*Primary Examiner* — Phuoc Tran (57) ABSTRACT

Architecture for comparing images by building an initial map from the average color and an inserted blackened area. Accordingly, a map can be built that is more information-rich and smaller, thereby making the system more efficient. The architecture employs a Kohonen neural network (or self-organizing map (SOM)) by guiding the learning of the SOM using characteristics of the images such as average color and a central area. A strong component of the average color of the image and the central area at the approximate center of the image are added to the uninitialized SOM, which allows related colors to converge toward the central area of the image. When input, the SOM organizes the color content of the image on a map, which can be used to compare the image with other images.

20 Claims, 8 Drawing Sheets

IMAGE ANALYSIS THROUGH NEURAL NETWORK USING IMAGE AVERAGE COLOR

BACKGROUND

The handling of complex objects such as images is becoming a more demanding issue given the ease in which images and other similar media can be created, communicated, and stored. In particular, finding images that look visually similar is becoming a relevant problem. Different analysis techniques exist that have been applied to address this problem. Most of the techniques identify different factors of an image and compare those factors to define a measure of similarity for the images.

For example, a predominant color (e.g., blue) in a first image can be compared to the predominant color of a second image. If there is computed to be a high degree of color similarity it can be determined the images are similar. Additionally or alternatively, a different set of factors can be utilized and compared to determine the degree of similarity, and then to classify images.

A Kohonen neural network, also known as self-organizing map (SOM) is a way of classifying information. In a classic application of a Kohonen neural network to compare images, an uninitialized map (or random map) is used as a starting point. An image is used as an input, and the image trains the map. Eventually, the map vectors align with the content of the input, thereby organizing the information contained in the image. By activating specific vectors in the map, information can be obtained, and the images can be compared. A problem arises when the color content is very broad. Comparing a large set of images becomes difficult, because an equally large map is required.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture builds an initial map out of the average color and a black area. This allows building a map that is more information-rich and smaller, thereby making the system more efficient. The architecture is employed to visually compare images, using a Kohonen neural network (or self-organizing map (SOM)) by guiding the learning of the SOM using characteristics of the images such as average color and shape of the objects in the image. A strong component of the average color of the image and the blackened area at the approximate center of the image are added to the uninitialized SOM, which allows dark colors to converge toward the center of the image. The SOM identifies shapes and color patterns in the image. When input, the SOM organizes the color content of the image on a map, which can be used to compare the image with other images.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is an improves image processing by adding a strong component of the average color of the image to the uninitialized self-organizing map (SOM) (also referred to as Kohonen neural network), as well as adding a colored area (e.g., a "black dot") at or near the center of the vector map, which allows colors to converge toward the center. By activating certain vectors in the map, information can be obtained, and the images can be compared. The architecture uses a smaller map effectively making the architecture efficient. However, it is to be understood that it is not a requirement that the reduced map be employed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
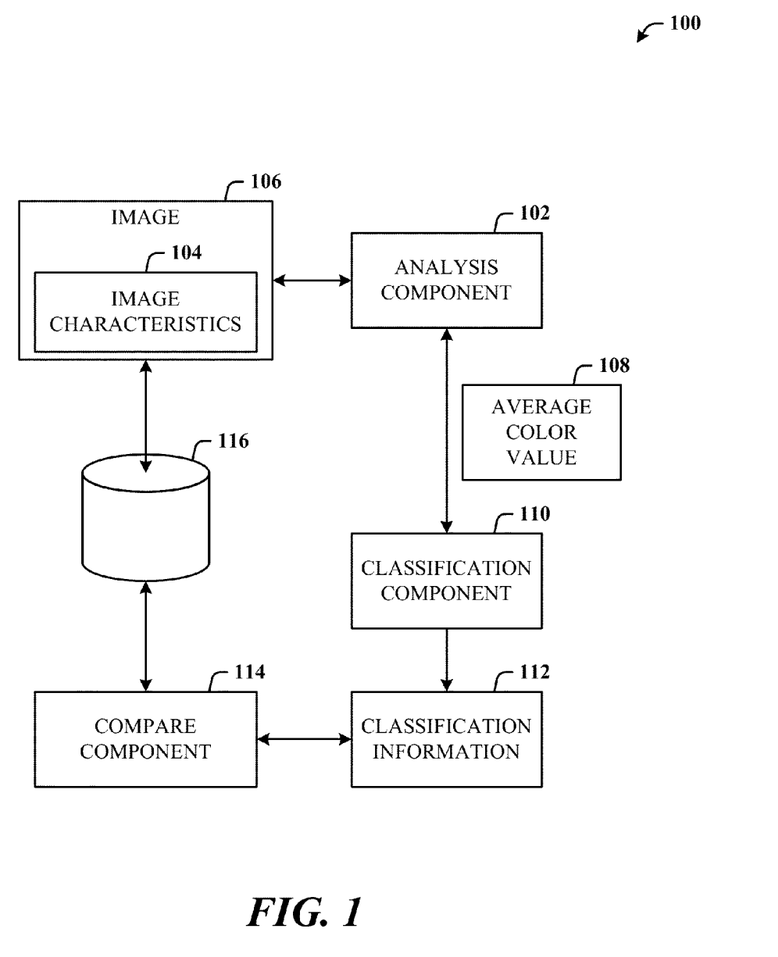
FIG. 1 illustrates a computer-implemented image system in accordance with the disclosed architecture.

FIG. 1 illustrates a computer-implemented image system 100 in accordance with the disclosed architecture. The system 100 includes an analysis component 102 for analyzing image characteristics 104 of an image 106 that include an average color value 108, and a classification component 110 for classifying the image 106 relative to a second image based on classification information 112 computed from the average color value. The analysis component 102 adds a colored area at or near a center of the image 106 that guides learning of the classification component 110. The colored area can be black such that dark colors converge toward the center. In other words, the colored area at or near the center uses a color of a shape in the image such that colors converge toward the colored area at or near the center. The classification component 110 includes a self-organizing map (SOM) for classifying the image 106, and the SOM is uninitialized. The classification information 112 is employed by a compare component 114 for statistical similarity analysis, and the similarity results are stored in a storage location 116 for retrieval.

Note that the colored area can be any color so long as the color of the colored area is not in the Kohonen color map. For example, the colored area can be white, red, or blue, for example, insofar as none of the respective colors is in the color map.

The analysis component 102 builds a reduced in size vector map and initializes the vector map using a gradient of all colors in a spectrum at a predetermined brightness. The analysis component 102 also builds a reduced in size vector map and initializes borders of map using vectors that represent the average color value of the image 106. The analysis component 102 computes a trained map for the image 106 and a trained map for the second image, and compares the trained maps by computing statistical error between corresponding vectors of the trained maps.

Put another way, the system 100 comprises the analysis component 102 for analyzing the image characteristics 104 of the image 106 that include the average color value 108 and a colored area added at or near a center of the image 106. The system 100 also includes the classification component 110 that employs an SOM for classifying the image 106 relative to a second image based on the classification information 112 computed from the average color value. The colored area can be black, or a color of one or more shapes in the image, and the colored area guides learning of the classification component 110.

The analysis component 102 builds a reduced in size vector map, and initializes the vector map using a gradient of all colors in a spectrum at a predetermined brightness, initializes borders of vector map using vectors that represent the average color value of the image, and initializes a vector at the center of the vector map with zero values. The analysis component 102 computes a trained map for the image 106 and a trained map for the second image, and compares the trained maps by computing statistical error between corresponding vectors of the trained maps.

Figure 2:
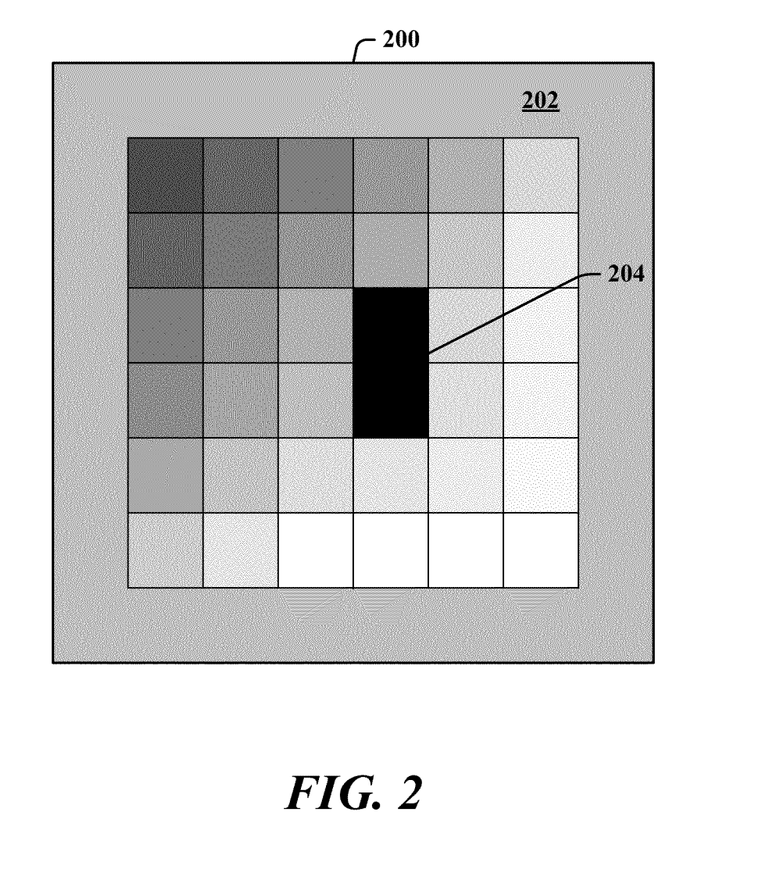
FIG. 2 illustrates an exemplary initialized vector map.

FIG. 2 illustrates an exemplary initialized vector map 200. The vector map 200 includes a perimeter region 202 (e.g., one pixel wide annular region about a center) that is the average color, and a central area 204 (e.g., darkened such as with the color black) is imposed at or near the center of the map 200. Note that if colors in the image are reversed (e.g., the image shapes are drawn in lights colors on a dark background), then the area 204 can be a light color (e.g., white). The area between the perimeter region 202 and the central area 204 is a gradient of the entire spectrum at a given level of luminosity (brightness). When using a dark color, the central area 204 makes colors close to the darker color (e.g., black) into a comparable dot. Colors derived from the average color gather around the borders (or perimeter), while other color components organize on the overall color spectrum.

Figure 3:
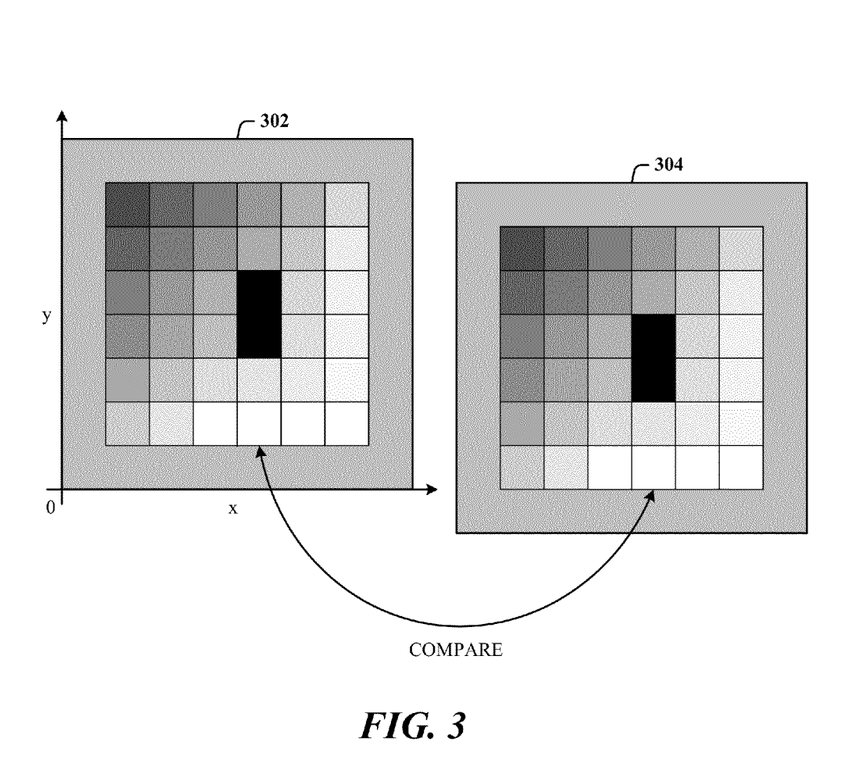
FIG. 3 illustrates a compare process of two initialized vector maps.

FIG. 3 illustrates a compare process 300 of two initialized vector maps. A first vector map 302 is compared to a second vector map 304 on a vector-by-vector basis. Comparing each vector M1(x,y) with the corresponding vector M2(x,y) provides a good comparison between the first and second images. Here, the maps are identical; thus, the compare process 300 will result in a high probability of similarity. The first vector map 302 is an 8×8 as is the second vector map 304. The compare process 300 shows that vectors M1(5,2) and M2(5, 2) are being compared.

Following is a mathematical representation for the algorithm of image processing.

1. Start with an image
2. Calculate the average color of the image: $v_{avg} = \overline{(r, g, b)}_{avg}$
3. Build a vector map $M_{(x,y)}$ where $x < \alpha$ and $y < \alpha$,
    where $\alpha$ is the size of the map and
    each component of the map is a vector of the form $M_{(x, y)} = \overline{(r, g, b)}_{(x,y)}$
4. For each vector in M where $x = 0$, $y = 0$, $x = \alpha - 1$ and $y = \alpha - 1$, set the value to $v_{avg}$
5. For the vector at $M_{(\alpha/2,\alpha/2)}$ set the value to $\overline{(0, 0, 0)}$
6. Build a vector map $S_{(i,j)}$ where $i < \beta$ and $j < \beta$,
    where $\beta$ is the size of the map and each component of the map is a vector of the form $S_{(i,j)} = \overline{(r, g, b)}_{(i,j)}$
7. Resize the input image such that the image fits in a canvas of size $(\beta, \beta)$
8. While $t < n$, where n is a fixed number of passes, or some arbitrary exit criterion
    8a. For each pixel in the input image, initialize the S vector map, such that
        $S_{(i,j)} = \overline{(r, g, b)}_{(corresponding\ pixel\ in\ input\ picture)}$
    8b. For each vector in S, find the vector in M that is the closest, using the Euclidean distance:

$$d = \sqrt{\left(r_{S_{(i,j)}} - r_{M_{(x,y)}}\right)^2 + \left(g_{S_{(i,j)}} - g_{M_{(x,y)}}\right)^2 + \left(b_{S_{(i,j)}} - b_{M_{(x,y)}}\right)^2}$$

8c. Once the closest vector $\bar{c}$ at (x', y') is found in M, move the closest vector closer to the corresponding vector
        $\bar{d}$ at (i', j') in S using a given adjustment function:
        $M_{(x',y')} = M_{(x',y')} + \theta(\bar{c}, t)\delta(t)(\bar{d} - \bar{c})$
            where $\theta$ is an adjustment factor that is a function of $\bar{c}$, and
            $\delta$ is an adjustment factor that decreases with time
9. Once calculated, keep the final map M and store the final map with the initial image
10. Perform the same calculation for another image
11. Compare the maps using any statistical error method, where each vector is compared to each corresponding vector in the maps, and this is the final value of how similar each image is to the other image.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
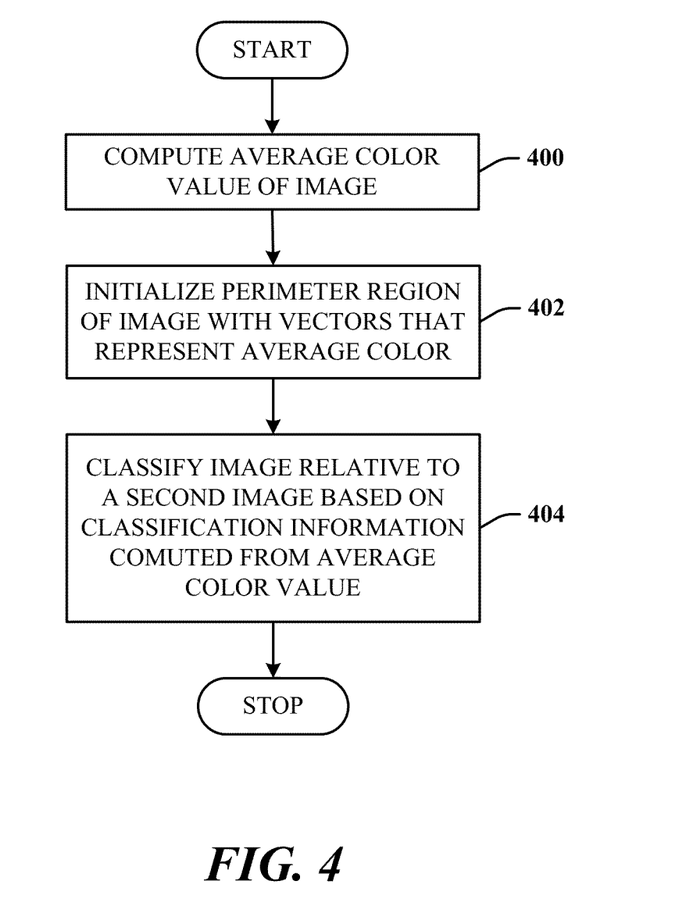
FIG. 4 illustrates a method of image processing that comprises the following acts.

FIG. 4 illustrates a method of image processing that comprises the following acts. At 400, an average color value of an image is computed. At 402, a perimeter region of the image is initialized with vectors that represent the average color. At 404, the image is classified relative to a second image based on classification information computed from the average color value.

Figure 5:
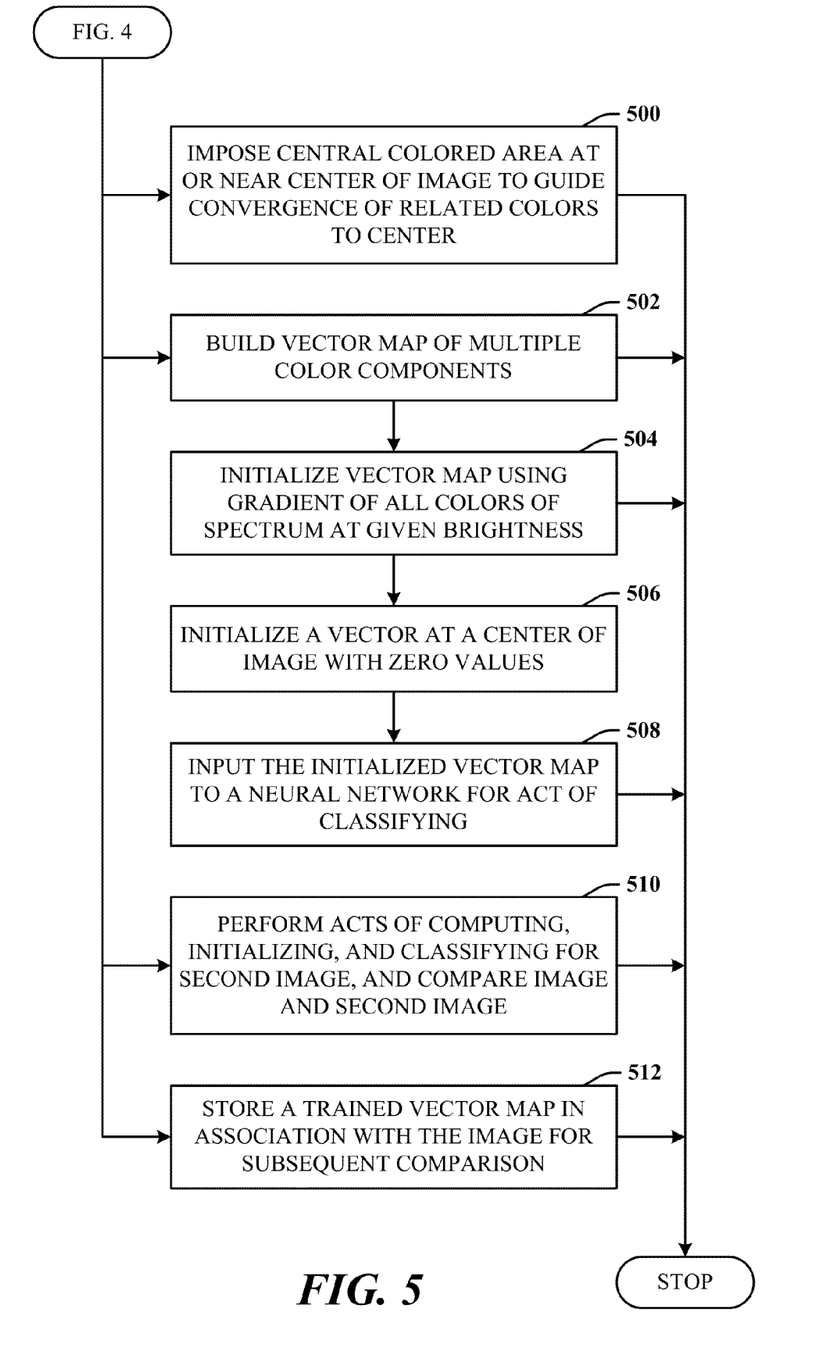
FIG. 5 illustrates additional acts in the image processing method of FIG. 4.

FIG. 5 illustrates additional acts in the image processing method of FIG. 4. At 500, a central colored area is imposed at or near a center of the image to guide convergence of related colors to the center. At 502, a vector map of multiple color components is built. At 504, the vector map is initialized using a gradient of all colors of a spectrum at a given brightness. At 506, a vector is initialized at a center of the image with zero values. At 508, the initialized vector map is input to a neural network for the act of classifying. At 510, the acts of computing, initializing, and classifying for the second image are performed, and the image and the second image are compared. At 512, a trained vector map is stored in association with the image for subsequent comparison.

Figure 6:
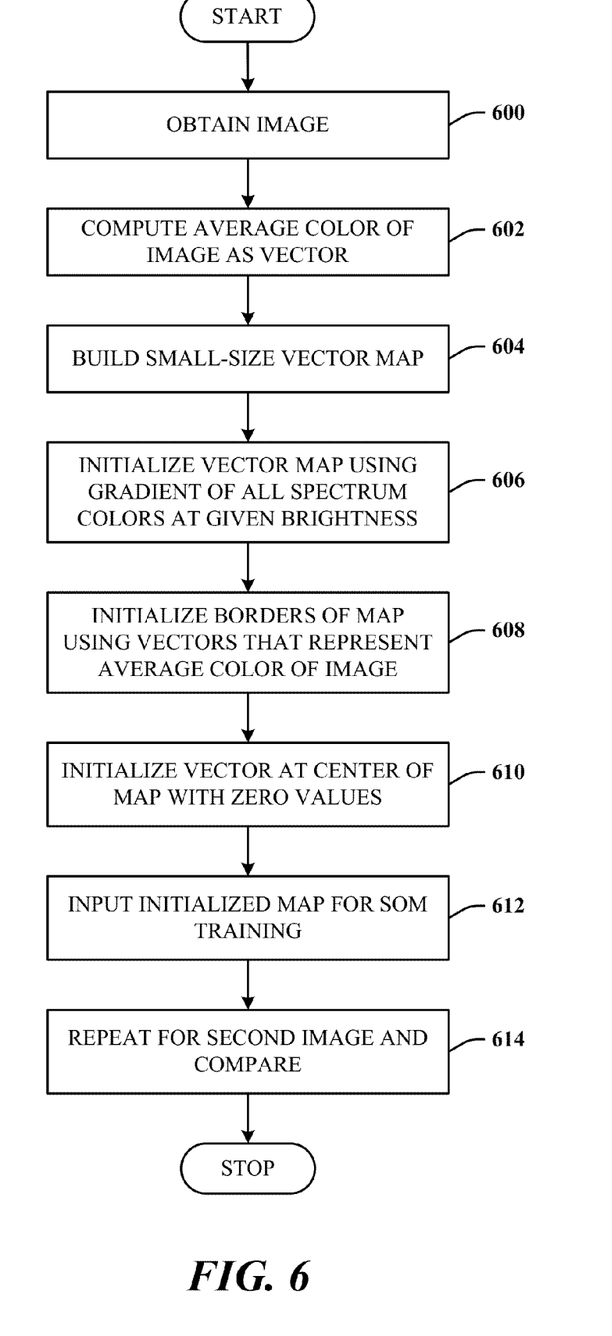
FIG. 6 illustrates a method of image analysis.

FIG. 6 illustrates a method of image analysis. At 600, an image is obtained. At 602, the average color value of the image is computed as a vector (e.g., red, green, blue). At 604, a small-sized vector map is built (e.g., 16×16 vectors) where each vector has three components (e.g., red, green, blue). At 606, the vector map is initialized with a gradient of all colors in the spectrum at a given brightness. At 608, the "borders" (a perimeter or annular region) of the map is initialized with vectors representing the average color of the image. At 610, the vector is initialized at the center of the map with zero values (e.g., values (0,0,0)). At 612, the initialized vector map is used as the starting point of the SOM (or Kohonen neural network). At 614, the above steps are repeated for a second image and compared. The trained maps of the first and second image are compared by calculating the statistical error between the corresponding vectors of the maps. The statistical error is the result of the comparison of the images, indicating how one image is different from another image.

Figure 7:
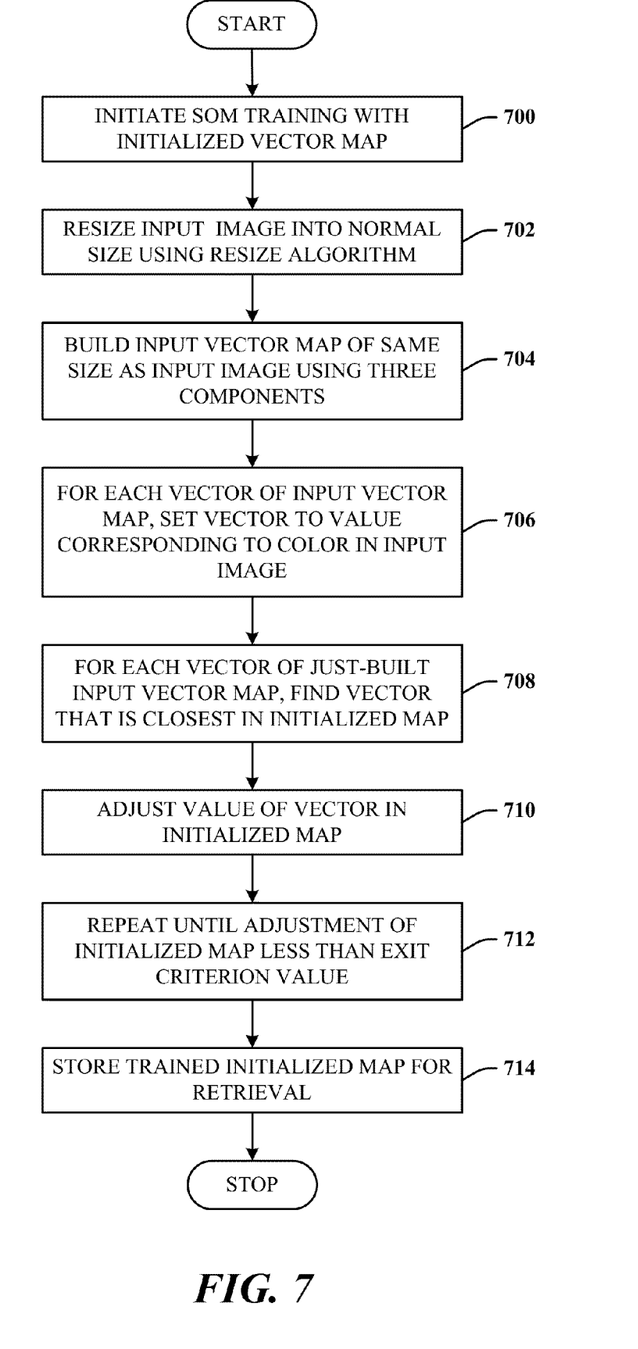
FIG. 7 illustrates additional details for classification of the method of image processing in FIG. 6.

FIG. 7 illustrates additional details for classification of the method of image processing in FIG. 6. At 700, SOM training is initiated using the initialized vector map. At 702, the input image is resized into a standard size (e.g., 160×160 pixels) using a resizing algorithm. At 704, an input vector map of the same size is built as the input image, where each vector has three components (e.g., red, green, and blue). At 706, for each vector of the input vector map, set the vector to the value corresponding to the color in the input image (e.g., if the pixel at (0, 0) has color (8, 45, 56); set vector at (0, 0) to values (8, 45, 56)). At 708, for each vector in the just-built input vector map, find the vector that is the closest (e.g., using a Euclidean or geometrical distance) in the initialized map. At 710, the value of the vector in the initialized map is adjusted. At 712, the adjustment of the initialized map is repeated until the adjustment is less than a given exit criterion value. Alternatively, the exit criterion can be defined by a number of repetitions rather than an adjustment level. At 714, the initialized map (now a trained map) is stored at a location where the map can be found (e.g., next to the input image, in a new file, etc.).

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
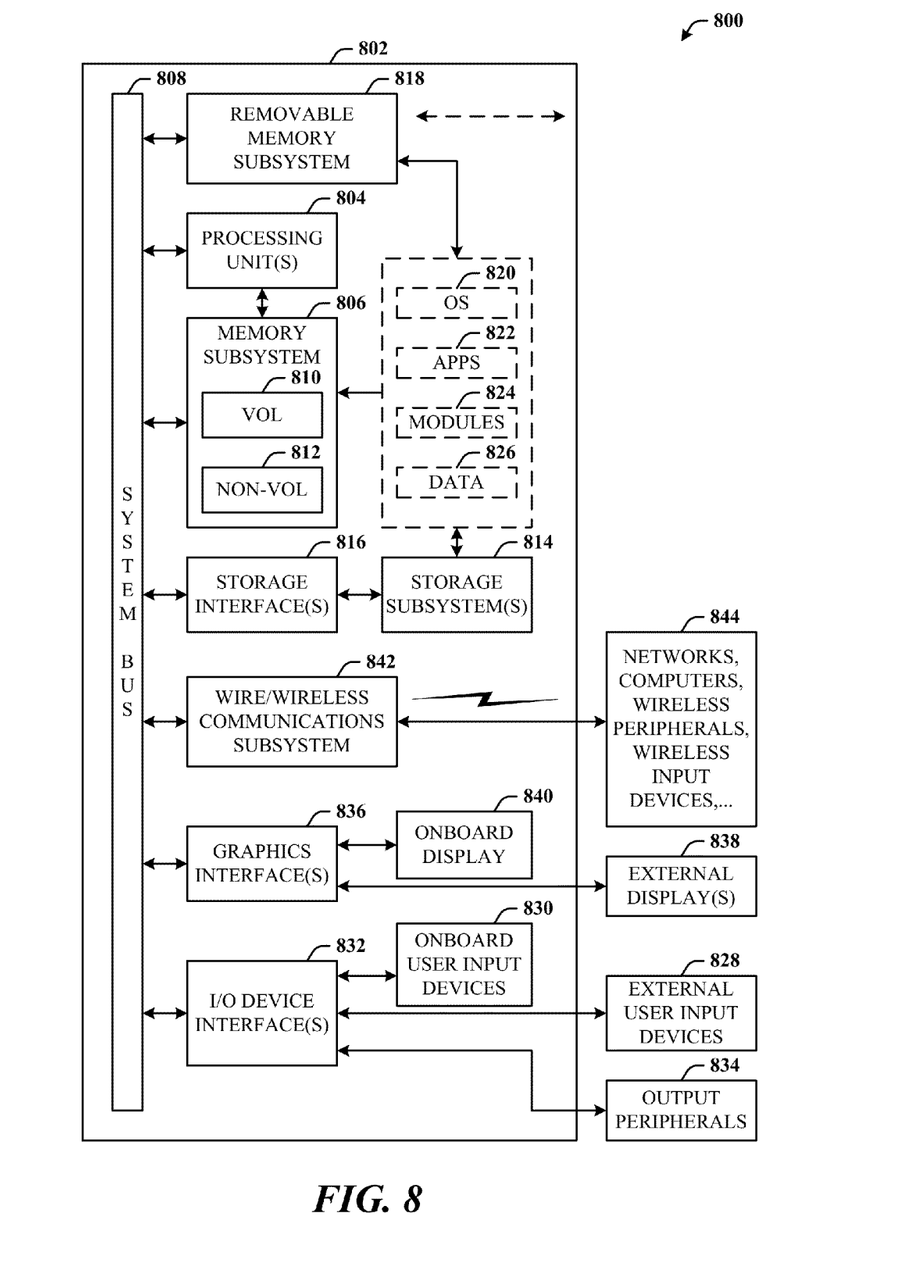
FIG. 8 illustrates a block diagram of a computing system operable to execute image processing in accordance with the disclosed architecture.

Referring now to FIG. 8, there is illustrated a block diagram of a computing system 800 operable to execute image processing in accordance with the disclosed architecture. In order to provide additional context for various aspects thereof, FIG. 8 and the following discussion are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the memory subsystem 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes storage subsystem(s) 814 and storage interface(s) 816 for interfacing the storage subsystem(s) 814 to the system bus 808 and other desired computer components. The storage subsystem(s) 814 can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The one or more application programs 822, other program modules 824, and program data 826 can include the system 100 of FIG. 1, the vector map 200 of FIG. 2, the compare process 300 of FIG. 3, and the methods represented by the flow charts of FIGS. 4-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Computer readable media can be any available media that can be accessed by the computer 802 and includes volatile and non-volatile media, removable and non-removable media. For the computer 802, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP) using logical connections via a wired/wireless communications subsystem 842 to one or more networks and/or other computers. The other computers can include workstations, servers, routers, personal computers, microprocessor-based entertainment appliance, a peer device or other common network node, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or has other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented image system, comprising:
an analysis component that builds a reduced in size vector map for analyzing image characteristics of an image, the vector map includes a perimeter region that is an average color value of the image;

a classification component for classifying the image relative to a second image based on classification information computed from the average color of the image; and a microprocessor that executes computer-executable instructions associated with at least one of analysis component or the classification component.

2. The system of claim 1, wherein the analysis component adds a colored area at or near a center of the image that guides learning of the classification component.

3. The system of claim 2, wherein the colored area at or near the center uses a color of a shape in the image such that colors converge toward the colored area at or near the center.

4. The system of claim 1, wherein the classification component includes a self-organizing map (SOM) for classifying the image.

5. The system of claim 4, wherein the SOM is uninitialized.

6. The system of claim 1, wherein the analysis component builds a reduced in size vector map and initializes the vector map using a gradient of all colors in a spectrum at a predetermined brightness.

7. The system of claim 1, wherein the analysis component builds a reduced in size vector map and initializes borders of map using vectors that represent the average color value of the image.

8. The system of claim 1, wherein the analysis component computes a trained map for the image and a trained map for the second image, and compares the trained maps by computing statistical error between corresponding vectors of the trained maps.

9. A computer-implemented image system, comprising:
an analysis component for analyzing image characteristics of an image that include an average color value and a colored area added at or near a center of the image;
a classification component that employs an SOM for classifying the image relative to a second image based on classification information computed from the average color value; and
a microprocessor that executes computer-executable instructions associated with at least one of analysis component or the classification component.

10. The system of claim 9, wherein the colored area is a color of one or more shapes in the image, and the colored area guides learning of the classification component.

11. The system of claim 9, wherein the SOM is uninitialized.

12. The system of claim 9, wherein the analysis component builds a reduced in size vector map, and initializes the vector map using a gradient of all colors in a spectrum at a predetermined brightness, initializes borders of vector map using vectors that represent the average color value of the image, and initializes a vector at the center of the vector map with zero values.

13. The system of claim 9, wherein the analysis component computes a trained map for the image and a trained map for the second image, and compares the trained maps by computing statistical error between corresponding vectors of the trained maps.

14. A computer-implemented method of image processing performed by a computer system executing machine-readable instructions, the method, comprising acts of:
computing an average color value of an image;
initializing a perimeter region of the image with vectors that represent the average color; and
classifying the image relative to a second image based on classification information computed from the average color value.

15. The method of claim 14, further comprising imposing a blackened area at or near a center of the image to guide convergence of dark colors to the center.

16. The method of claim 14, further comprising building a vector map of multiple color components.

17. The method of claim 16, further comprising initializing the vector map using a gradient of all colors of a spectrum at a given brightness.

18. The method of claim 17, further comprising:
initializing a vector at a center of the image with zero values; and
inputting the initialized vector map to a neural network for the act of classifying.

19. The method of claim 14, further comprising performing the acts of computing, initializing, and classifying for the second image, and comparing the image and the second image.

20. The method of claim 14, further comprising storing a trained vector map in association with the image for subsequent comparison.

* * * * *